United States Patent [19]
Jarman

[11] 3,983,635
[45] Oct. 5, 1976

[54] AUTO FRAME GAUGE
[75] Inventor: Davis R. Jarman, Brunswick, Ga.
[73] Assignee: Virgil Hinson, Brunswick, Ga. ; a part interest
[22] Filed: Aug. 14, 1975
[21] Appl. No.: 604,823

[52] U.S. Cl. .............................. 33/288; 33/203.18
[51] Int. Cl.² ......................................... G01B 5/25
[58] Field of Search ............ 33/286, 287, 288, 1 H, 33/227, 228, 83, 84, 86, 203.18

[56] References Cited
UNITED STATES PATENTS

| | | | |
|---|---|---|---|
| 2,575,194 | 11/1951 | Smith | 33/288 |
| 2,581,021 | 1/1952 | Jacobsen et al. | 33/288 |
| 3,151,396 | 10/1964 | Junkins | 33/288 |
| 3,704,522 | 12/1972 | Blubaugh et al. | 33/1 H |
| 3,810,313 | 5/1974 | Hicks | 33/288 |

FOREIGN PATENTS OR APPLICATIONS

| | | | |
|---|---|---|---|
| 1,071,620 | 12/1959 | Germany | 33/288 |
| 963,282 | 7/1964 | United Kingdom | 33/287 |

Primary Examiner—William D. Martin, Jr.
Attorney, Agent, or Firm—Clarence A. O'Brien; Harvey B. Jacobson

[57] ABSTRACT

A gauge for checking an automobile frame before and after damage to the frame has been repaired has a pair of telescoping tubes suspended from the frame for supporting a pointer which extends transversely from the frame. The pointer is connected to the tubes by a transmission arrangement which will cause the pointer to be displaced when half the distance the tubes are moved relative to one another. By using three, or more, gauges together with a datum line disposed extending beside the vehicle the damage to the frame can be readily determined.

12 Claims, 5 Drawing Figures

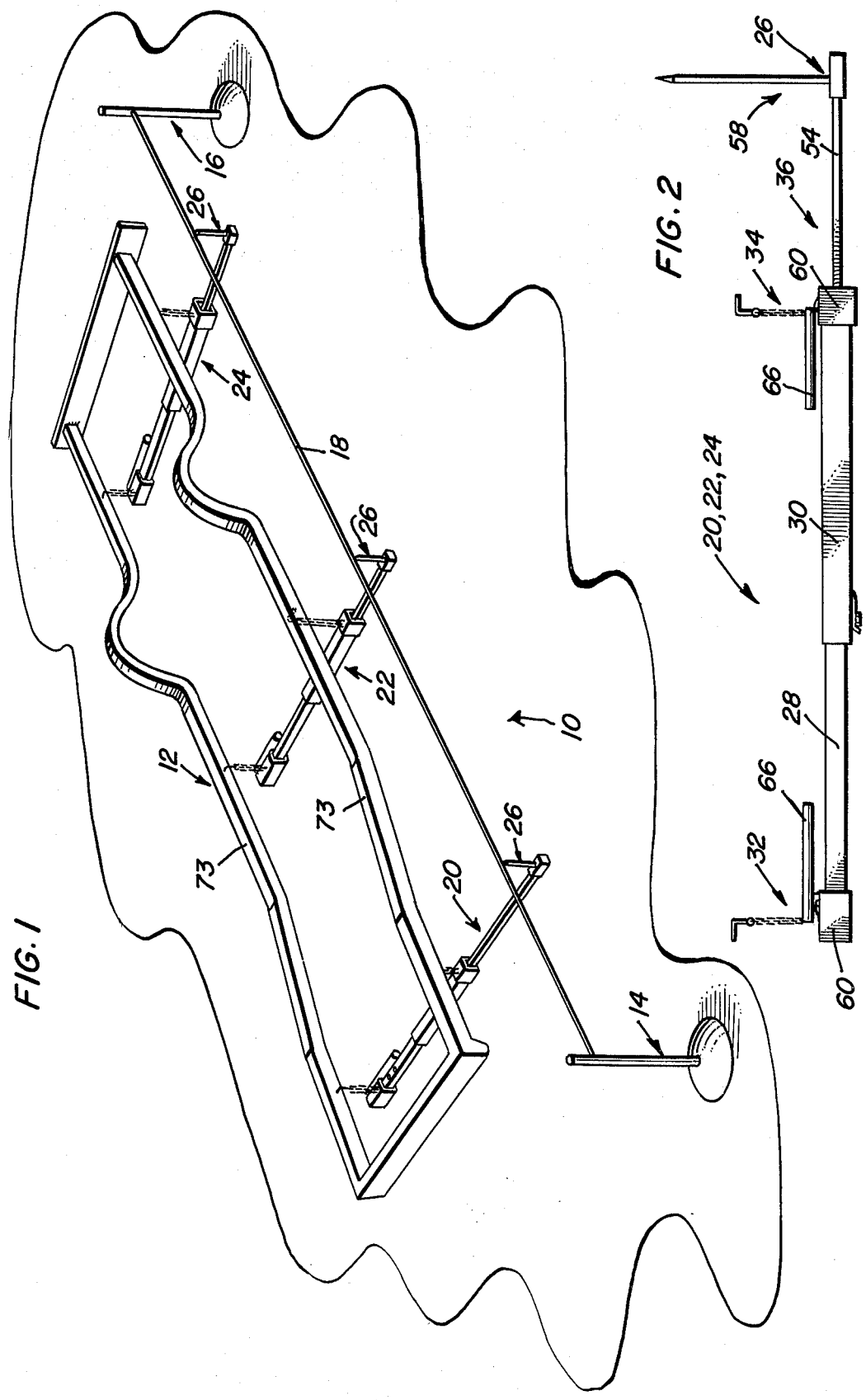

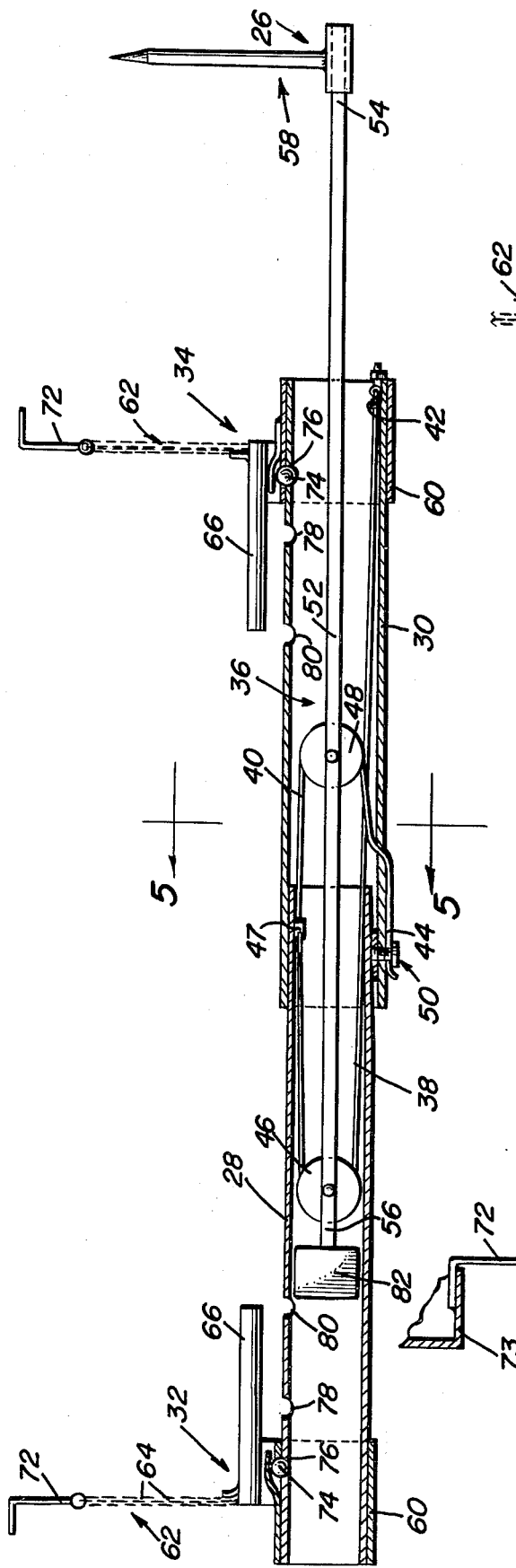
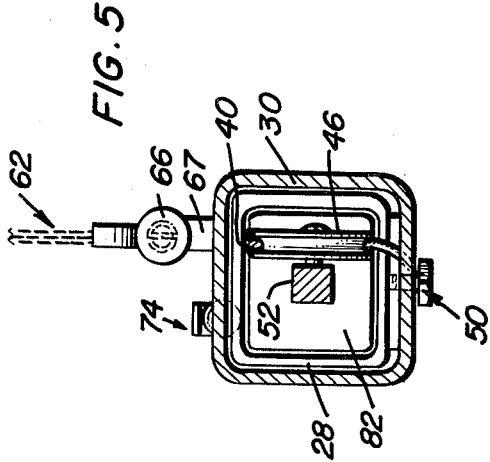
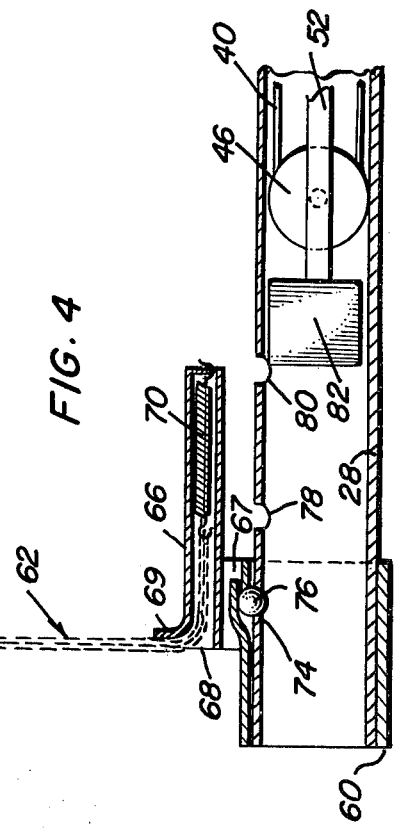

AUTO FRAME GAUGE

BACKGROUND OF THE INVENTION

1. Field of the Invention

This invention relates generally to checking the condition of various parts of automobiles and similar vehicles, and particularly to a gauge for checking an automobile frame before and after damage to the frame has been repaired in order to ascertain the extent of the damage and the correction thereof.

2. Description of the Prior Art

During the performance of motor vehicle frame straightening operations in body shops scattered throughout the country, a difficulty frequency arises as to the degree of damage, or bending of the frame, which the vehicle frame has incurred. Further, it is also frequency difficult to ascertain when the vehicle frame has been properly straightened. Accordingly, in order to facilitate the determination of the amount of damage, or bending, sustained by the frame, various gauges have been devised which are intended to permit reading of the alignment of the frame of a vehicle in a simple, easy, and reliable manner.

One prior motor vehicle frame alignment measuring mechanism employs gauges suspended beneath the frame of an automobile so as to extend transversely outwardly from a common side of the frame in such a manner as to permit sighting along appropriate devices provided on the outward ends of the gauges and to determine alignment of the frame. This mechanism, and other similar known devices, have the advantage of being subject to clogging and jamming due to accumulations of dirt, and the like, in vunerable areas of the equipment. Further, the manner of adjustment of the sighting devices of the aforementioned patent cannot always be performed with the accuracy required of such measurements.

Another approach to obtaining a reading of the amount of deflection, or bending, of a vehicle frame is to provide the sighting points direclty beneath the vehicle. This arrangement, however, has the inherent disadvantage of being difficult to read.

SUMMARY OF THE INVENTION

It is an object of the present invention to provide a gauge and gauge system for checking a vehicle frame before and after damage to the fraine has been repaired.

It is another advantage of the present invention to provide a gauge for checking an automobile frame which permits reading the alignment of the frame from a point beside the vehicle so as to facilitate the taking of the reading.

It is still another object of the present invention to provide a gauge which requires relatively little maintenance, and yet is easily adjusted to different size vehicle frames.

These and other objects are achieved according to the present invention by providing a gauge having: first and second telescoping tubes; hangers for connecting the telescoping tubes to a frame of a vehicle being checked; a pointer assembly mounted in the first and second tubes and arranged extending from the second of the tubes for indicating a predetermined distance; and a movement transmission arrangement connected to the tubes and to the pointer assembly for displacing the pointer assembly in response to relative movement of the tubes. Preferably, the tip, or outer, end of the pointer assembly will move one-half the distance of the relative displacement of the most distant ends of the first and second telescoping tubes.

The movement transmission arrangement advantageously includes a cable having ends and disposed about a pair of pulleys rotatably mounted in spaced relation on the pointer assembly. One of the aforementioned pulleys is preferably disposed in the first of the tubes and the other of the pulleys disposed in the second of the tubes, with the flexible member connected at one of the ends thereof to one end of the second of the tubes and at the other of the ends thereof to the other end of the second of the tubes. By this arrangement, a transmission of movement of the pointer assembly, as described above, is obtained in a simple, yet rugged and reliable manner.

The pointer assembly preferably includes a longitudinally extending element having longitudinally spaced ends, with a pointer member mounted on one of the ends and extending perpendicularly with respect to the longitudinal extent of the element. The aforementioned pulleys are mounted on the longitudinally extending element at points spaced from the point member, and preferably with one of the pulleys being disposed adjacent the other of the ends of the element.

A pair of substantially identical hangers are advantageously employed to connect the telescoping tubes to the frame by suspending the tubes beneath the frame. Each of these units preferably includes a collar slidably mounted on the associated one of the telescoping tubes and having mounted thereon a suitable housing provided with an opening through which passes a length of chain formed by a plurality of interconnected links. A tension spring is disposed within the aforementioned housing and is anchored to the housing and connected to the length of chain for connecting the chain to the collar, and accordingly to the associated one of the telescoping tubes. An angle bracket, or the like, engageable with the vehicle frame is connected to the chain at a point thereon spaced from the aforementioned housing, whereby the spring exerts a bias on the chain which is countered by the weight of the gauge so as to permit lengths to be drawn into the housing when the weight of the gauge is reduced by exertion of a force on the gauge. In this manner, a predetermined number of lengths may be removed from the housing in order to assure that the distance of each of the telescoping tubes from the frame is the same at each end of the gauge.

Each hanger unit advantageously further includes a ball detent which cooperates with a plurality of holes arranged in the associated tube in order to permit adjustment of the gauge to different widths of vehicle frames.

A particularly advantageous feature of the present ivnention is the provision of tubes having substantially square cross sections in which the various cables and point element are arranged. Further, a substantially cubic block, or at least a block having a substantially square cross section, is connected to the other of the ends of the longitudinally extending element of the pointer assembly for guiding the element within the associated one of the telescoping tubes in keeping the pointer number of the pointer assembly in a predetermined orientation.

By arranging gauges as described above in a system wherein at least three gauges are arranged in parallel relationship at spaced points along the longitudinal extent of a frame being checked, a vehicle frame may be checked for damage before and after the damage has been repaired in a simple, easy, and reliable manner. More specifically, a flexible member, advantageously connected to suitable supports, forms a datum line to which are aligned the pointer members of the endmost, or foremost and rearmost, of the gauges and the extent of the damage, or bending, of the frame determined by comparing the position of the pointer member of the middle gauge with the datum line.

These together with other objects and advantages which will become subsequently apparent reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

FIG. 1 is a schematic, perspective view showing a frame checking gauge system according to the present invention.

FIG. 2 is a side elevational view showing a vehicle frame checking gauge according to the present invention.

FIG. 3 is a vertical, longitudinal, sectional view showing the gauge of FIG. 2, but drawn to a larger scale.

FIG. 4 is a fragmentary, vertical longitudinal sectional view showing the left end portion of FIG. 3 to a larger scale.

FIG. 5 is a fragmentary, sectional view taken generally along the line 5—5 of FIG. 3.

DESCRIPTION OF THE PREFERRED EMBODIMENTS

Referring now more particularly to FIG. 1 of the drawings, a system 10 of gauges for checking automobile frame 12 before and after damage to frame 12 has been repaired, in a conventional manner not disclosed herein, includes a pair of spaced supports 14 and 16 arranged beside a damaged vehicle (not shown) which includes frame 12. A flexible member, such as string 18, is connected to supports 14, 16 in a suitable manner and is arranged extending between the supports 14, 16 for forming a datum line. The use of this datum line will become apparent below.

As illustrated, three substantially equally spaced gauges 20, 22 and 24 are suspended from frame 12 in a manner to be described below. Each of the gauges 20, 22 and 24 includes a pointer 26 extending from beneath frame 12 a distance equal to the extent of the pointer 26 of the other of the gauges 20, 22, 24 and toward the string 18. The endmost of the gauges, specifically gauges 20 and 24, have the pointer 26 thereof aligned with string 18, wherein the center gauge 22, will indicate the extent of the damage to the frame 12.

Referring now more particularly to FIGS. 2–5 of the drawings, each gauge 20, 22 and 24 includes first and second telescoping tubes 28 and 30 intended to be suspended from side rails of a frame 12 as by hanger units 32 and 34 and also includes a pointer arrangement 36 mounted in the corresponding tubes 28 and 30 and arranged extending from tube 30 for indicating a predetermined distance over the length of the associated gauge, and further includes a movement transmission arrangement 38 connected to tubes 28 and 30 and two point arrangement 36 for displacing arrangement 36 in response to relative movement of tubes 28 and 30. Preferably, pointer arrangement 36, or more specifically the pointer 26 associated therewith, will be displaced one-half the distance of the relative movement of the fartherest spaced ends of tubes 28 and 30 relative to one another.

Movement transmission arrangement 38 advantageously includes a cable 40 having ends 42 and 44, and a pair of pulleys 46 and 48 rotatably mounted in spaced relation on the pointer arrangement 36. One of the pulleys, pulley 46 being shown in FIG. 2, is disposed in tube 28, while the other of the pulleys, specifically pulley 48, is disposed in tube 30. Cable 40 is connected at one of the ends thereof, specifically end 42, to the outermost end of tube 30 at the other of the ends, specifically end 44, to the other end, or inner end, of the same tube 30 such that cable 40 is arranged extending around the pulleys 44 and 48 intermediate the ends 42, 44 of the cable 40. In this manner, relative movement between the tubes 28 and 30 will displace pulleys 46 and 48, which are in fixed relationship with respect to one another, within the tubes 28 and 30. A bracket 50 is provided in the manner illustrated in FIG. 3 of the drawings for preventing the inner end of tube 28 from sliding sufficiently into tube 30 so as to rub the cable 40 and cause the cable 40 to wear excessively. As will be noted, an aperture is provided in tube 30 in order to permit cable 40 to pass out of tube 30 and be anchored by bracket 50.

Pointer arrangement 36 advantageously includes a longitudinally extending element 52 having longitudinally spaced ends 54 and 56. A pointer member 58, which forms pointer 26, is mounted on one of the ends, specifically end 54, and extends perpendicularly with respect to the longitudinal extent of element 52. The pulleys 46 and 48 are rotatably mounted on element 52 at points thereof spaced from pointer member 58, with one of the pulleys preferably being disposed adjacent end 56 of element 52 as is shown in FIG. 3 of the drawings.

Each of the hanger units 32 and 34 preferably includes a collar 60 slidably mounted on the associated one of the tubes 28 and 30. A length of chain 62 formed by a plurality of, for example, one-half inch interconnected links 64 is anchored at one end in a housing 66 mounted on collar 60 in a conventional manner as by strut 67. Housing 66, which is advantageously in the form of a cylinder, is provided with an opening 68 through which chain 62 passes. A lip 69 facilitates guiding of chain 62 around a substantially 90 degree angle from the horizontal orientation of housing 67 to the general vertical orientation of the chain 62 outside of housing 66. A, for example, conventional coiled tension spring 70 is disposed within housing 66 and anchored to the latter in a conventional manner, and is also connected to chain 62 for anchoring chain 62 to housing 66. An angle bracket 72 engageable with a rail 73 of frame 12 is connected to chain 62 so as to attach the hanger unit 32, 34, and accordingly the associated tube 28, 30, to frame 12. Spring 70 acts to exert a bias on chain 62 which is countered by the weight of the associated gauge and draw links 64 into housing 66 when the weight of the associated gauge is reduced as by exertion of a countering force on the gauge. In this manner, the number of links of chain 62 outside of housing 66 may be easily and made identical for each hanger 32, 34.

Each hanger unit 32, 34 advantageously further includes a ball detent 74 which cooperates with holes 76, 78 and 80 provided in tubes 28 and 30. Each of the tubes 28 and 30 is provided with a set of holes 76, 78 and 80 divided into an outside set consisting of hole 76 and an inside set consisting of hole 78 and 80. As will be appreciated from FIG. 3, the aforementioned holes 76, 78 and 80 are arranged for selectively receiving the ball of the ball detent 74 and permitting adjustment of the associated gauge to different width vehicle frames. More specifically, the ball of the ball detent 74 engages in one of the holes 76, 78 and 80, and since the detent 74 is retained on the associated collar 60, the collar 60 will be retained in a predetermined position relative to the tube 28, 30 on which the collar 60 is disposed.

Tubes 28 and 30 both have substantially square cross sections, as can best be seen from FIG. 5 of the drawings. Further, pointer arrangement 36 further includes a substantially cubic block 82, or at least a block having a square cross section mating with the inside circumference of tube 28, and mounted on end 56 of element 52 for guiding the latter within tube 28 and retain the pointer member 58 in a predetermined orientation relative to the tubes 28, 30.

OPERATION

As will be appreciated from the above description and from the drawings, an automobile frame 12 may be checked before and after damage to the frame has been repaired by suspending at least the three illustrated gauges 20, 22 and 24 from the side rails 73 of the damaged frame 12, aligning the pointers 26 on the endmost gauges 20, 24 with the datum line formed by string 18 disposed along side frame 12, and reading the relative position of the pointer 26 of gauge 22 disposed between the gauges 20, 24 relative to string 18 to determine the amount of deflection of frame 12.

When tubes 28 and 30 are pulled out or pushed in relative to one another, pointer member 58 moves in and out accordingly, for example, one-half the distance that tubes 28 and 30 combined move. This is due to cable 40 being on rollers or pulleys 46 and 48 and traveling from the anchor point at end 42 of tube 30, around pulley 46, to the anchor point 47 on tube 28, around pulley 48, and back to the final anchor point at end 44 of tube 30. The slide bar or longitudinally extending element 52 will travel, for example, one-half the distance that hanger units 32 and 34 will travel. Ball detents 74, associated with hanger units 32, 34 will lock the associated collar 60 onto the respective tubes 28, 30, and the respective springs 62 will pull back the chain 62 to shorten the latter and permit both ends of the gauge to be an equal distance from the associated side rails 73 of frame 12. By making the gauges 20, 22 and 24 of the same length, pointer member 58 of gauge 22, as seen in FIG. 1 of the drawings, will align with string 18 when the frame 12 is straight.

A gauge 20, 22, 24 may be hung on a frame 12 by chain 62 and associated hooks or angle brackets 72, magnets (not shown) may be used in lieu of brackets 72. Each angle bracket 72 will be placed on an opposed frame side rail 73 at approximately opposite points on the rails. If, for example, the frame is over 36 inches wide, use the outside indentations formed by hole 76. That is, place tha ball of the ball detent 74 in the hole 76. If the frame is, for example, less than 36 inches wide, use one of the two sets of inner indentations formed by holes 78 and 80, making sure that each side is in the same hole 78, 80. The ball detents 74 are spring loaded to lock the collar 60 in place on the respective tubes 28, 30, with a nominal amount of pressure being required to cause the collar 60 to overcome the force of the spring, push the ball out of the cooperating hole, and permit the collar 60 to be moved to a different location on its associated tube 28, 30. When hanging the gauges by the chain 62, pull the chain 62 out of their respective housings 66, making sure that the same number of links 64 are pulled out on each side of the gauge.

As will be appreciated from the above description and from the drawings, the gauges disclosed herein are superior because all cables and pulleys are mounted inside of square tubing. This lengthens the useful life of the device and keeps dirt out of the moving parts, avoids tangling of the various elements, and generally prevents the device from jamming and failing. Further, a primary advantage of the present invention is that the pointer is outside of the car and not in the middle or underneath of the vehicle. By being outside of the vehicle, one can easily stretch a line or string on all three pointers to see where and how much the frame is bent. In addition, it is unnecessary to jack up the vehicle or put same on a suitable rack as is required with center-sighting systems.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gauge for checking a vehicle frame before and after damage to the frame has been repaired, the gauge comprising, in combination:
    a. first and second relatively telescoping tube members having remote outer ends;
    b. attachment means on said remote ends for connecting the tube members to a frame of a vehicle;
    c. elongated pointer means mounted in the first and second tube members for lengthwise shifting relative thereto and having one end extending from the outer end of the second of the tube members for indicating a predetermined distance; and
    d. movement transmission means connected to the tube members and to the pointer means for retracting and extending said one end of said pointer means relative to said outer end of said second tube member in response to extension and retraction, respectively, of the tube members and with the retracting and extension of said one end of said pointer means relative to the outer end of said second tube member being at a rate equal to one-half the relative extension and retraction of said tube members, whereby the spacing between said one end of said pointer means and a point mid-way between said attachment means will remain constant throughout extension and retraction of said tube members.

2. A gauge for checking a vehicle frame before and after damage to the frame has been repaired, the gauge comprising, in combination:
    a. first and second relative extendable members;
    b. attachment means for connecting the members to a frame of a vehicle;
    c. pointer means mounted from the first and second member and arranged extending from the second of the members for indicating a predetermined distance; and d. movement transmission means connected to the members and to the pointer means for displacing the pointer means in response to relative movement of the members, said members comprising telescoping first and second tubes in which said pointer means is mounted, said movement transmission means including a cable having ends, a pair of pulleys rotatably mounted in spaced relation on the pointer means, one of the pulleys being disposed in the first of the tubes and the other of the pulleys being disposed in the second of the tubes, the cable being connected at one of the ends thereof to a one end of the second of the tubes at the other of the ends thereof to the other end of the second of the tubes, and the cable being arranged extending around the pulleys intermediate of the ends of the cable and anchored to the first tube at a point between the pair of pulleys.

3. A structure as defined in claim 2, wherein the pointer means includes a longitudinally extending element having longitudinally spaced ends, and a pointer member mounted on one of the ends and arranged extending perpendicularly with respect to the longitudinal extent of the element, with the pulleys being mounted on the longitudinally extending element at points spaced from the pointer member, one of the pulleys being disposed adjacent the other of the ends of the longitudinally extending element.

4. A structure as defined in claim 3, wherein the attachment means includes a pair of substantially identical hanger units, each hanger unit comprising, in combination:
1. a collar slidably mounted on an associated one of the first and second tubes;
2. a length of chain formed by a plurality of interconnected links;
3. a housing mounted on the collar and provided with an opening;
4. a tension spring disposed within and anchored to the housing; and
5. an angle bracket engageable with the vehicle frame, the chain being connected to the angle bracket and to the spring with the spring exerting a bias on the chain which is countered by the weight of the gauge and acting on the chain to draw links into the housing when the weight of the gauge is reduced by exertion of a force on the gauge which counters the weight of the gauge.

5. A structure as defined in claim 4, wherein each hanger unit further includes a ball detent, and each of the tubes is provided with a plurality of holes arranged for selectively receiving the detent, the holes permitting adjustment of the gauge to different width vehicle frames.

6. A structure as defined in claim 5, wherein the tubes both have substantially square cross sections, and the pointer means further including a block having a substantially square cross section mating with the substantially square cross section of the first of the tubes, the block connected to the other of the ends of the longitudinally extending element of the pointer means for guiding the element within the first of the tubes and keeping the pointer member of the pointer means in a predetermined orientation.

7. A structure as defined in claim 1, wherein the attachment means includes a pair of substantially identical hanger units, each hanger unit comprising, in combination:
1. a slide slidably mounted on an associated one of the first and second members;
2. a length of chain formed by a plurality of interconnected links;
3. a housing mounted on the slide and provided with an opening;
4. a tension spring disposed within and anchored to the housing; and
5. an angle bracket engageable with the vehicle frame, the chain being connected to the angle bracket and to the spring, with the spring exerting a bias on the chain which is countered by the weight of the gauge and acting on the chain to draw links into the housing when the weight of the gauge is reduced by exertion of a force on the gauge which counters the weight of the gauge.

8. A structure as defined in claim 7, wherein each hanger unit further includes a ball detent, and each of the tubes is provided with a plurality of holes arranged for selectively receiving the detent, the holes permitting adjustment of the gauge to different width vehicle frames.

9. A structure as defined in claim 2, wherein said first and second tubes are substantially square in cross section.

10. In combination with a vehicle frame to be checked before and after damages to the frame has been repaired, a frame alignment checking assembly comprising a pair of spaced supports arrangeable beside said frame, a flexible member connected to the supports and arranged extending between the supports for forming a datum line, three substantially equally spaced elongated gauges suspended from longitudinally spaced portions of the frame, each of the gauges including first and second telescoping tubes, attachment means connecting the tubes to said frame, and a pointer extending transversely from beneath the frame, said gauges being of substantially equal lengths and arranged transversely of the frame and extending toward the flexible member, said pointer means of each gauge being mounted in the first and second tubes and extending from the second tube for indicating a predetermined distance from the frame, the endmost pair of the gauges having the pointers thereof aligned with the flexible member and the center of the gauges providing an indication of damage to the frame by any misalignment of the pointer member of the center of the gauges with respect to the flexible member, and movement transmission means connected to the tubes and to the pointer means for displacing the pointer means in response to relative movement of the tubes.

11. A gauge for checking a vehicle frame before and after damage to the frame has been repaired, the gauge comprising, in combination:
a. first and second relatively extendable members;
b. attachment means for connecting the members to a frame of a vehicle;
c. pointer means mounted from the first and second member and arranged extending from the second of the members for indicating a predetermined distance; and
d. movement transmission means connected to the members and to the pointer means for displacing the pointer means in response to relative movement of the members, said movement transmission means including means for displacing said pointer means relative to one of said members an amount equal to one-half the relative displacement of said members.

12. An elongated gauge for checking a vehicle frame before and after straightening, said gauge including first and second generally parallel elongated members including a first pair of adjacent end portions and a second pair of remote outer end portions, means supporting said first and second members for relative lengthwise extension and retraction of said remote end portions, support means carried by said remote end portions for support of said remote end portions from spaced frame portions, elongated pointer means extending lengthwise of said gauge and supported from the latter for shifting relative to both of said elongated members, one end of said pointer, means projecting outwardly beyond the outer end of the corresponding elongated member, and movement transmission means connected to said elongated members and said elongated pointer means operative to extend and retract said one end of said pointer means relative to the outer end of said corresponding elongated member in response to relative retraction and extension, respectively, of said remote end portions and with the extension and retraction of said one end portion of said pointer means relative to the outer end of said corresponding end portion being at a rate equal to one-half the rate of relative retraction and extension of said remote end portions of said elongated members, whereby the spacing between the outer end of said pointer means and a point mid-way between said support means will remain constant throughout extension and retraction of said elongated members relative to each other.

* * * * *